United States Patent

Wu et al.

[11] Patent Number: 5,851,004
[45] Date of Patent: Dec. 22, 1998

[54] HIGH PRESSURE ACTUATED METAL SEATED DIAPHRAGM VALVE

[75] Inventors: Jing-Chau Wu, Morris Plains; Patrick P. Barber, Kinnelon; Lewis L. Aldridge, Parsippany-Toy Hills Township, all of N.J.

[73] Assignee: Parker-Hannifin Corporation, Cleveland, Ohio

[21] Appl. No.: 888,583

[22] Filed: Jul. 7, 1997

Related U.S. Application Data

[63] Continuation-in-part of Ser. No. 731,517, Oct. 16, 1996, Pat. No. 5,730,423.

[51] Int. Cl.$^6$ ........................................................ F16K 7/17
[52] U.S. Cl. ........................ 251/331; 251/63.5; 251/368
[58] Field of Search ................................... 251/331, 368, 251/63.5, 62

[56] References Cited

U.S. PATENT DOCUMENTS

| | | |
|---|---|---|
| 4,828,219 | 5/1989 | Ohmi et al. . |
| 5,186,434 | 2/1993 | Nishimura et al. . |
| 5,253,671 | 10/1993 | Kolenc . |
| 5,413,311 | 5/1995 | Arstein et al. . |
| 5,485,984 | 1/1996 | Itoi et al. . |
| 5,551,477 | 9/1996 | Kanno et al. .................... 251/331 X |
| 5,653,419 | 8/1997 | Uchisawa et al. ................ 251/331 X |
| 5,730,423 | 3/1998 | Wu et al. .............................. 251/331 |

Primary Examiner—Kevin Lee
Attorney, Agent, or Firm—Anthony J. Casella; Gerald E. Hespos; Ludomir A. Budzyn

[57] ABSTRACT

An all metal diaphragm valve is provided. The valve includes a housing having an inlet passage and an outlet passage each of which communicates with a valve chamber. Portions of the inlet passage in the valve chamber are surrounded by a toroidal sealing bead. The valve further includes a resilient metallic diaphragm which is dished and in an unbiased condition projects away from the toroidal sealing bead. Thus, fluid may flow through the inlet passage, through the valve chamber and out of the outlet passage. Actuation of a valve stem will cause the metal diaphragm to deflect toward and into sealing engagement with the toroidal sealing bead. The surface of the diaphragm that engages the toroidal sealing bead is formed from a very hard metallic alloy. However adjacent layers of the diaphragm are formed from softer metals.

16 Claims, 2 Drawing Sheets

HIGH PRESSURE ACTUATED METAL SEATED DIAPHRAGM VALVE

This application is a continuation-in-part of application Ser. No. 08/731,517 filed Oct. 16, 1996, U.S. Pat. No. 5,703,423.

BACKGROUND OF THE INVENTION

1. Field of the Invention

The subject invention relates to a diaphragm valve formed substantially from metallic materials to ensure purity of gas flowing therethrough.

2. Description of the Prior Art

The prior art diaphragm valve includes a valve housing formed with a valve chamber. Inlet and outlet passages extend through the valve housing and communicate with the valve chamber. A flexible diaphragm defines one wall of the prior art valve chamber, and is positioned opposite the entry of the inlet passage into the valve chamber.

The prior art diaphragm valve further includes a diaphragm actuator that communicates with the side of the diaphragm external of the valve chamber. The actuator may comprise a piston, a spring, pressurized fluid or some combination thereof. Forces exerted by the actuator cause the diaphragm to deflect into sealing engagement with portions of the valve housing surrounding the inlet passage to the valve chamber. Movement of the piston away from the valve chamber may move the diaphragm away from the inlet passage and may permit fluid to flow from the inlet passage, through the valve chamber and into the outlet passage. Some prior art diaphragm valves include a diaphragm that is biased into the opened position. Thus movement of the actuator away from the valve chamber may permit the inherent biasing of the diaphragm to open the inlet passages to the valve chamber.

Prior art diaphragm valves for gas flow systems typically include a valve stem that is movable to deflect the diaphragm and to thereby-open or close the valve. Some such prior art valves are manually operable, and include a threaded valve stem engaged in a bonnet on the valve. Manual rotation of the threaded valve stem moves the valve stem axially in the bonnet for deflecting the diaphragm and for opening or closing the valve. Some prior art manually operated diaphragm valves include a short cylindrical member between the threaded valve stem and the diaphragm. The short cylindrical member isolates the diaphragm from the rotational movement of the valve stem, thereby reduces wear on the diaphragm. However, the short cylindrical member adds to the cost of the valve and complicates the assembly. Accordingly there is no apparent reason for including such a short cylindrical member in a situation where rubbing of the valve stem against the diaphragm is not a problem.

Some prior art diaphragm valves include automatic actuators. The automatic actuators drive the valve stem axially without rotation. Hence, the valve stem of the prior art automatically actuated diaphragm valve will not rub on the diaphragm. Consequently, the short cylindrical member that is used in some prior art manual diaphragm valves has not been provided between the diaphragm and the prior art automatically actuated and axially driven valve stem.

Effective sealing is an important requirement for virtually all valves. Sealing typically is enhanced by utilizing an elastomeric or plastic material on one or both members defining a sealing interface. For example, some prior art diaphragm valves include an elastomeric diaphragm that can be urged into sealing engagement with a valve seat surrounding the entry of the inlet passage into the valve chamber. Other diaphragm valves may include an elastomeric or plastic valve seat surrounding the inlet passage and configured for engagement by the diaphragm. Elastomeric or plastic sealing members perform very well in many fluid flow valves, such as valves carrying water and valves carrying liquid chemicals that will react with metals.

Many industrial processes, such as processes performed in the semi-conductor and microprocessor industries, require the presence of high purity gas. The gases typically are produced at off-site locations, and are delivered to the appropriate manufacturing facility in pressurized containers. The containers then are placed into communication with piping systems for use as needed in the manufacturing facilities. Valves in the piping systems are used to periodically stop, start or control the flow of high purity gas.

Piping systems for carrying high purity gases at a manufacturing facility should be constructed to maintain the high purity of the gas delivered to the facility. In particular, all parts of the gas delivery system should be constructed from materials that prevent gas diffusion, moisture absorption and dimensional changes in response to certain gas exposure. Gas diffusion and moisture absorption are associated with many plastic and rubber materials. Additionally, certain plastics are known to swell upon exposure to certain gases. Still further, many plastics will degrade rapidly when exposed to high temperature gas flows. As a result, plastic or rubber gaskets and fittings that are suitable for many fluid flow applications typically are avoided in high purity gas flow systems.

To minimize diffusion of gas into and through plastic components and to minimize moisture absorption, many valves for high purity gas flow systems are provided with valve seats and/or valving members formed from plastics that substantially minimize these problems. For example, prior art diaphragm valves used in high purity gas flow systems may employ a metallic diaphragm and a PCTFE valve seat surrounding the inlet passage to the valve. PCTFE is known to provide very good sealing properties and to present minimal gas diffusion and moisture absorption problems. Although these diaphragm valves have worked fairly well in the past, there is a desire for even greater degrees of purity in the gases being carried. Accordingly, there is a desire to provide valves that are free of plastics, including the heretofore acceptable plastics such as PCTFE.

The simple removal of plastic components from prior art valves would eliminate problems associated with gas diffusion and moisture absorption. However, the industrial processes in which these valves are used must positively stop the flow of gases in the closed condition of the valve. Thus, engineers have been faced with a dichotomy. Prior art valves could be formed with at least some plastic components to provide effective sealing, but with the potential for gas diffusion and moisture absorption. Alternatively prior art valves could be formed without plastic components to avoid gas diffusion and moisture absorption, but with the near certainty for less than optimum sealing performance.

The prior art includes all metal valves that rely upon a significant wiping action between two members to be sealed. This wiping action occurs in some prior art valves as one planar surface is twisted into tight sealing engagement with a second planar surface having an inlet or outlet passage. In other prior art valves, the wiping occurs as a conical member is slid into a cylindrical opening. Wiping actions of this type invariably generate wear debris and cause particles to enter the gas stream. These particles significantly affect the purity of the gas and can adversely affect the manufacturing process being carried out in the presence of the gas.

The quality of the seal achieved by a diaphragm valve depends, in part, on the positioning and alignment of the various components. For example, a valve stem that is not perfectly aligned to the center of the diaphragm can lead to uneven deflection of the diaphragm and hence imperfect sealing. Additionally, improper alignment of the valve stem can lead to a faster wear of the diaphragm by creating more stress on one portion of the diaphragm than on another. Components of a diaphragm valve can be manufactured to a very high tolerance for assuring perfect alignment. However, the quality control for achieving near perfect alignment increases manufacturing costs significantly.

The quality of the seal also depends upon the pressure of the gas flowing through the valve and the force exerted by the valve stem on the diaphragm. A higher gas pressure differential across the closed diaphragm generally requires higher forces to be exerted by the prior art valve stem for achieving proper sealing. The force exerted by a manually rotatable valve stem can be varied as needed to achieve proper sealing. Thus, some manually operable diaphragm valves achieve a high quality seal in valves with a gas pressure differential across the closed diaphragm of about 3000 p.s.i. It is more difficult to achieve a good seal in an automatically actuated diaphragm valve, because forces applied to the valve stem generally are not adjustable. Therefore, a automatically actuated diaphragm valves seldom have been used above a 500 p.s.i. gas pressure differential across the closed diaphragm. Actuators could be used for routinely exerting a much higher pressure on the diaphragm. However, such a high pressure on each actuation creates the potential for damaging the diaphragm or the sealing surface against which the prior art diaphragm is urged.

In view of the above, it is an object of the subject invention to provide a valve that achieves effective sealing without adversely affecting purity of gas flow through the valve.

It is another object of the subject invention to provide an all metal diaphragm valve that enables efficient sealing.

It is a further object of the subject invention to provide an all metal valve that substantially eliminates particle generation.

An additional object is to provide a valve that can operate for extended periods of time in the presence of high temperature gases.

Still a further object of the subject invention is to provide a valve that is dimensionally stable in the presence of virtually all gases.

Yet another object of the subject invention is to provide an all metal automatically actuated diaphragm valve that enables efficient sealing of high pressure gas.

SUMMARY OF THE INVENTION

The subject invention is directed to a diaphragm valve that has only metallic components exposed to gases flowing therethrough. The diaphragm valve of the subject invention includes a valve housing having an open-sided valve chamber. Inlet and outlet passages extend through the valve housing and into the valve chamber. Portions of the metallic valve housing surrounding the entry of the inlet passage into the valve chamber define a toroidal sealing bead that is concentric with the inlet passage and that may be unitary with the valve housing.

The diaphragm valve of the subject invention further includes a metallic diaphragm defining a wall of the valve chamber. The metallic diaphragm may be juxtaposed to the toroidal sealing bead that surrounds the entry of the inlet passage to the valve chamber. Central portions of the metallic diaphragm may be of dished configuration. Dished portions of the diaphragm project away from the inlet passage to define the open condition of the valve. The dished shape of the diaphragm requires a longer stroke for closure of the valve, and hence effectively defines a larger valve chamber which can accommodate a greater gas flow. The dished shape also provides resiliency which permits the valve to be repeatedly opened as explained further herein without being pulled open by an actuator.

The diaphragm valve of the subject invention further includes an actuating means for engaging the convex side of the metallic diaphragm opposite the valve chamber. The actuating means comprises a valve stem that may be movable axially toward and away from the metallic diaphragm. The valve stem may be operatively engaged with an automatic actuator for selectively urging the valve stem toward and away from the metallic diaphragm with a predetermined force. The actuator may be of known construction and may be operable for linearly moving the valve stem without a corresponding rotational movement thereof.

The actuating means further includes an actuating button disposed between the valve stem and the diaphragm. The actuating button is movably disposed adjacent an end of the valve stem and hence can float radially relative to the valve stem and the diaphragm. The end of the actuating button facing away from the valve stem is arcuately convex, and preferably is spherically generated. With this assembly of the actuating means, the actuator will drive the valve stem and the actuating button into engagement with the convex side of the metallic diaphragm for deflecting the metallic diaphragm toward the inlet passage and into tight sealing engagement with the toroidal sealing bead at the entry of the inlet passage into the valve chamber. In particular, actuation of the valve stem causes the metallic diaphragm to achieve a circular line of sealing contact with the toroidal sealing bead. The circular line of contact enabled by the toroidal sealing bead achieves a high quality seal despite the absence of a plastic or rubber material on either of the interengaged surfaces defining the seal. The actuating means will cause the surface of the diaphragm facing away from the inlet passage to deflect from an initially convex shape into a slightly concave shape. Thus, portions of the diaphragm will deflect across a plane defined by the toroidal sealing bead around the inlet to the valve chamber. This deflection into a concave shape will cause the actuating button to float radially relative to the valve stem into a position substantially centered on the axis about which the toroidal sealing bead is generated. Thus, with each actuation of the diaphragm valve, the actuating button will assume a very accurate coaxial alignment with the axis of the toroidal sealing bead but without the high cost that normally would be associated with efforts to achieve a high degree of precision. In this embodiment, the valve stem is not rotating, and hence the actuating button performs no function in isolating the diaphragm from rotational movement.

The diaphragm may be formed from a plurality of metal layers in stacked abutting relationship to one another. In particular, the diaphragm may include outer metallic layers formed from a hard metallic material that is not reactive to gases flowing through the valve. The hard metallic outer layers of the diaphragm may be sandwiched around at least one inner layer of a softer, more malleable metallic material.

However, the hard metallic outer layers are not bonded to the softer inner layers, thereby permitting small amounts of at least localized sliding movement of the hard layers relative to the soft layers. The hard metallic outer layers prevent the creation of wear debris after even a large number of valve actuations. Additionally, the hard metallic outer layers provide desirable resiliency for the diaphragm and ensure specified performance over a long life. The softer more malleable metal material between the outer layers permits a controlled micromovement and deformation of the diaphragm for achieving a high quality seal between the diaphragm and the toroidal sealing bead. This controlled micromovement and deformation enables the diaphragm to deform into any minor surface discontinuities that may exist in either the diaphragm or the toroidal sealing bead. The outer layers of the diaphragm may be formed from a metal alloy having a hardness HRC greater than 40. Inner portions of the diaphragm may be formed from copper or silver plated copper. The silver plating facilitate the micromovement between adjacent layers of the diaphragm.

DETAILED DESCRIPTION OF THE PREFERRED EMBODIMENT

Figure 1:
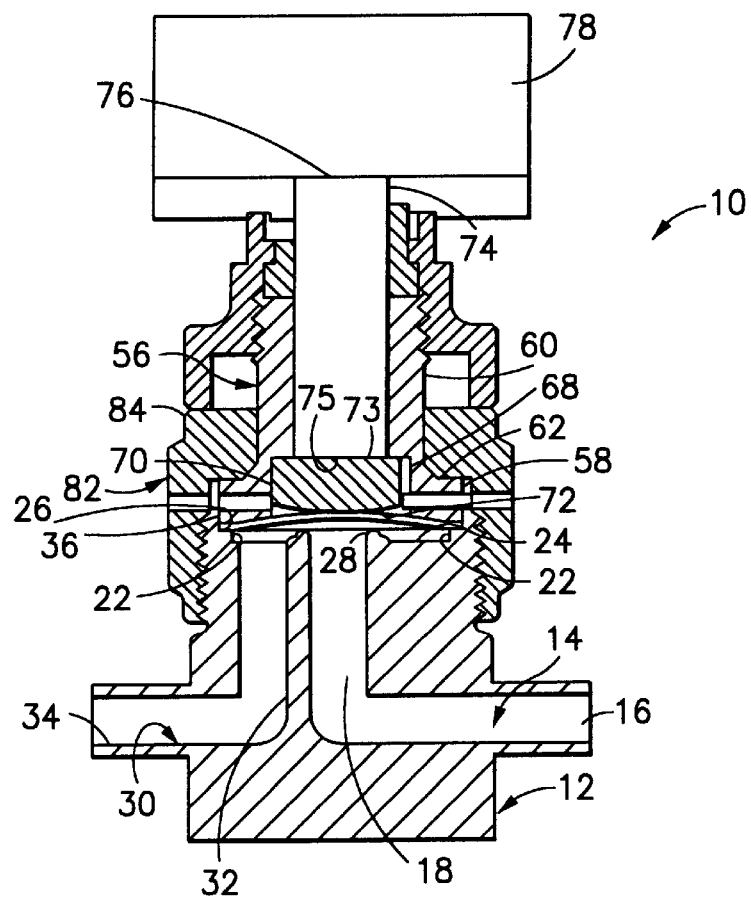
FIG. 1 is a cross-sectional view of a valve in accordance with the subject invention.

A valve in accordance with the subject invention is identified generally by the numeral 10 in FIG. 1. The valve 10 includes a metallic valve housing 12 unitarily molded and/or machined from a metallic material, and preferably from stainless steel. The valve housing 12 includes an inlet passage identified generally by the numeral 14 in FIG. 1. The inlet passage 14 includes orthogonally aligned upstream and downstream segments 16 and 18 respectively. The downstream segment 18 of the inlet passage 14 terminates at a valve chamber 20. The inlet passage 14 is operative to deliver a specified gas at pressures of up to 3000 p.s.i. into the valve chamber.

The valve chamber 20 includes a short cylindrical side wall 22 concentric with the downstream segment 18 of the inlet passage 14. The valve chamber 20 is further defined by a generally annular base wall 24 extending inwardly from the side wall 22 toward the downstream segment 18 of the inlet passage 14. The base wall 24 is orthogonal to the axis of the downstream segment 18 of the inlet passage 14 and orthogonal to the side wall 22. An annular diaphragm seat 26 extends radially outwardly from portions of the side wall 22 remote from the base wall 24. The diaphragm seat 26 is concentric with the axis of the downstream segment 18 of the inlet passage 14 and is substantially parallel to the base wall 24 of the valve chamber 20.

A toroidal sealing bead 28 forms the interface between the downstream segment 18 of the inlet passage 14 and the base wall 24 of the valve chamber 20. The toroidal sealing bead 28 effectively defines a semi-circle rotated about the axis of the downstream segment 18 of the inlet passage 14. Inner circumferential portions of the toroidal sealing bead 28 extend continuously and substantially tangentially from the cylindrical side walls defining the downstream segment 18 of the inlet passage 14. The toroidal sealing bead 28 defines a height measured from the base wall 24 substantially equal to the height of the side wall 22. Thus, a plane orthogonal to the axis of the downstream segment 18 of the inlet passage 14 and tangential to the toroidal sealing bead 28 will be coplanar with the diaphragm seat 26.

An outlet passage 30 is formed in the valve housing 12 and extending from the valve chamber 20 to an external location on the valve housing 12. More particularly, the outlet passage 30 includes an upstream segment 32 extending substantially parallel to the downstream segment 18 of the inlet passage 14. The upstream segment 32 of the outlet passage 30 intersects the bottom wall 24 of the valve chamber 20 at a location intermediate the toroidal sealing bead 28 and the side wall 22 of the valve chamber 20. The outlet passage 30 further includes a downstream segment 34 extending substantially colinearly with the upstream segment 16 of the inlet passage 14.

As shown most clearly in FIG. 1, the extreme upstream end of the inlet passage 16 and the extreme downstream end of the outlet passage 30 define nipples to which other pipes or fittings may be connected.

The valve housing 12 is further defined by a short cylindrical diaphragm positioning wall 36 extending concentrically about the axis of the downstream segment 18 of the inlet passage 16. The diaphragm positioning wall 36 defines a diameter substantially equal to the diameter of a diaphragm to be used with the valve 10. The height of the diaphragm positioning wall 36 exceeds the thickness of the diaphragm to be used in the valve 10, as explained further herein.

Outer portions of the valve housing 12 surrounding the valve chamber 20 are formed with an array of external threads for threadedly receiving a bonnet nut as explained further herein.

Figure 4:
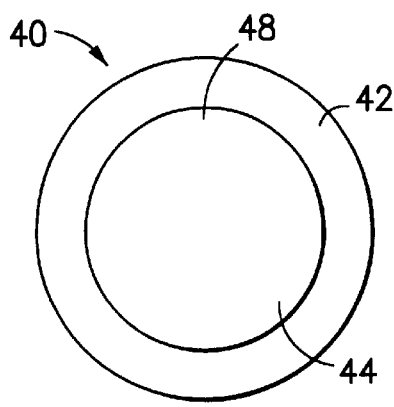
FIG. 4 is a top plan view of the diaphragm.
Figure 5:
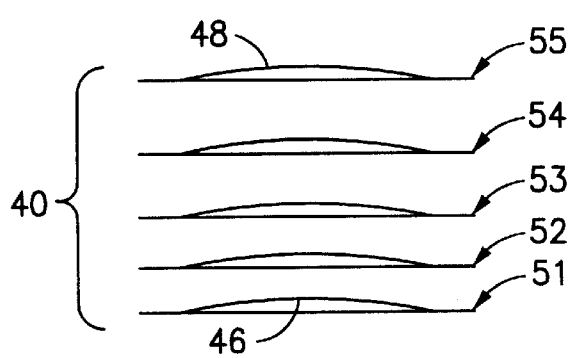
FIG. 5 is an exploded cross-sectional view of the diaphragm shown in FIG. 1.

The valve 10 further includes a metal diaphragm 40 as shown in FIGS. 4 and 5. The diaphragm 40 includes a substantially planar annular peripheral portion 42 and a resiliently dished intermediate portion 44. The planar annular peripheral portion 42 defines a diameter slightly less than the diameter defined by the diaphragm positioning wall 36 of the valve housing 12, and a thickness less than the height of the cylindrical diaphragm positioning wall 36. Additionally, the planar annular peripheral portion 42 defines an inside diameter adjacent the dished portion 44 of the diaphragm 40 which is approximately equal to the diameter defined by the side wall 22 of the valve chamber 20. Thus, the planar peripheral portion 42 of the diaphragm 40 is positioned on the cylindrical diaphragm seat 26 and within the diaphragm positioning wall 36.

The dished intermediate portion 44 has a inner face 46 that is initially concave and an outer face 48 that is initially convex. The diaphragm 40 is oriented such that the initially concave inner face 46 of the dished portion 44 faces the valve chamber 20. Conversely, the initially convex outer face 48 faces away from the valve housing 12.

As shown most clearly in FIG. 5, the diaphragm is of stacked configuration, and is formed from diaphragm layers 51–55. The layers 51, 53 and 55 are formed from a relatively hard, inert and resilient material, while the layers 52 and 54 are formed from a relatively softer material. In a preferred embodiment, the layers 51, 53 and 55 are formed from a metallic alloy exhibiting a hardness HRC of 45 to 60. The diaphragm layers 51, 53 and 55 preferably are formed from a cobalt chromium-nickel alloy, such as an alloy having 39%–41% cobalt; 19–21% chromium, 14%–16% nickel, 1.5%–2.5% manganese, 0.15 max percent carbon, 0.10 max percent beryllium and iron-balance (about 16%). An example of such an alloy is ELGILOY® which is sold by ELGILOY LP. The layers 52 and 54 of the diaphragm 50 are formed from a softer more malleable metallic material, such as copper, and preferably copper plated with silver. The respective layers 51–55 of the stacked diaphragm 40 are not bonded together. Hence, deformation and associated micromovement of adjacent layers is possible for accommodating surface irregularities that may exist in the toroidal sealing bead 28.

Returning to FIG. 1, the valve 10 further includes a diaphragm bushing 56 having a large diameter first end 58 and a small diameter second end 60 and a bearing shoulder 62 therebetween. The first end 58 of the bushing 56 defines an outside diameter substantially equal to the diameter of the diaphragm 40. Thus, the large diameter end 58 can be closely received within the diaphragm positioning wall 36. The first end 58 of the bushing 56 includes an end face having a generally planar outer peripheral surface 64 dimensioned for engaging the planar outer peripheral portion 42 of the diaphragm 40. The end face of the bushing 56 further includes a concave central portion 64 which is dished slightly more than the dished portion 44 of the diaphragm 40 to avoid interference therewith. The bushing 56 includes a non-threaded central aperture 68 extending entirely therethrough.

A stainless steel diaphragm actuator button 70 is slidably received for axial movement in the non-threaded central aperture 68. The diaphragm actuator button 70 is cross-sectionally smaller than the cross-section of the central aperture 68 through the bushing 56. Thus, the diaphragm actuator button 70 is capable of transverse movement or float within the central aperture 68 of the bushing 56. The diaphragm actuator button 70 includes a spherically generated convex actuating face 72 positioned adjacent the convex face 48 of the dished portion 44 on the diaphragm 40. The diaphragm actuator button 70 also includes an opposed end 73 aligned substantially orthogonally to the axis of the central aperture 68 in the bushing 56. The end 73 is planar and smoothly finished.

The valve 10 further includes a non-threaded valve stem 74 slidably engaged with the central aperture 68 in the bushing 56. The valve stem 74 includes opposed inner and outer ends 75 and 76. The inner end 75 of the valve stem 74 is smoothly finished and aligned substantially orthogonally to the axis of the central aperture 68. Thus, the smooth planar end 73 of the diaphragm actuator button 70 will be engaged by the smooth planar inner end 75 of the valve stem 74. The outer end 76 of the valve stem 74 is engaged with an actuator 78 which functions to selectively and non-rotatably urge the valve stem 74 toward or away from the valve chamber 20. Movement of the valve stem 74 toward the valve housing 12 will urge the smooth planar inner end 75 into the smooth planar end 73 of the actuator button 70. These forces will urge the convex actuating face 72 of the diaphragm actuator button 70 into the initially convex outer face 48 of the diaphragm 40, thereby causing a deflection of the diaphragm 40 into the valve chamber 20 as explained further herein. Conversely, threaded movement of the valve stem 74 away from the valve housing 12 will release forces exerted by the diaphragm actuator button 70 on the convex face 48 of the diaphragm 40, thereby enabling resilient return of the diaphragm toward an undeflected position as shown in FIGS. 1 and 2.

The valve 10 further includes a bonnet nut 82 threadedly engaged to the threads 38 on the valve housing 12. The bonnet nut 82 includes an inwardly extending flange 78 which surrounds the small diameter portions of the bushing 56, and which engages the shoulder 62 between the small and large diameter portions 60 and 58 of the bushing 56. Thus, threaded tightening of the bonnet nut 82 onto the valve housing 12 tightly urges the large diameter end 58 of the bushing 56 into secure gripping engagement with the diaphragm 40 for tightly securing the planar outer peripheral portion 42 of the diaphragm 40 against the diaphragm seat 26.

Figure 2:
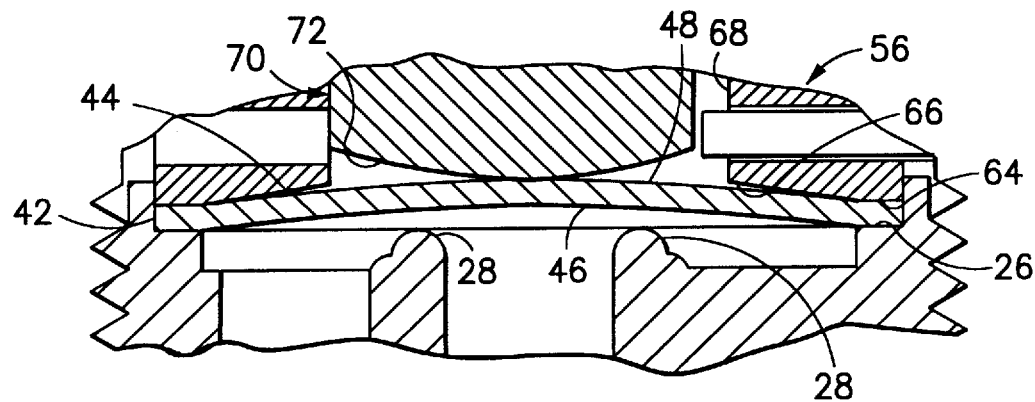
FIG. 2 is an enlarged cross-section showing the valve in the open condition.

As shown in FIGS. 1 and 2, the valve stem 74 is in a position relatively remote from the valve housing 12. In this position, the inherently resilient hard metallic alloy layers 51, 53 and 55 of the diaphragm 40 urge the smooth planar end 73 diaphragm actuator button 70 outwardly against the end 75 of the valve stem 74, such that a space exists between the toroidal sealing bead 28 and the concave face 46 of the diaphragm 40. Thus, the gaseous fluid flow may proceed without substantial impediment through the inlet passage 14 through the valve chamber 20 and out the outlet passage 30.

Figure 3:
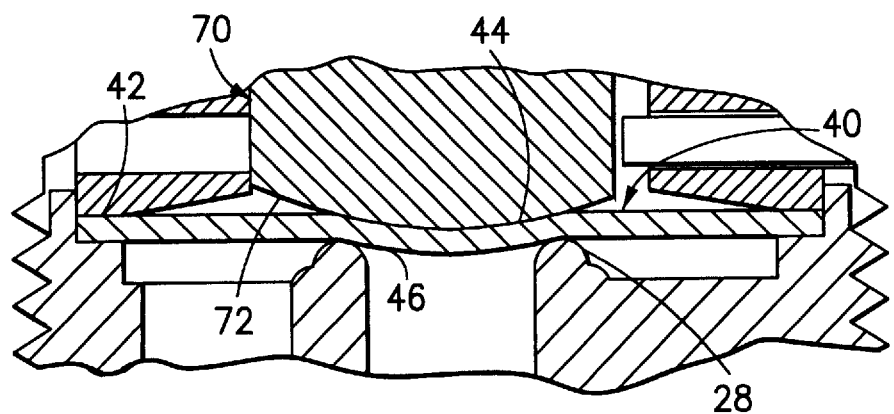
FIG. 3 is a cross-section similar to FIG. 2, but showing the valve in the closed condition.

The valve 10 may be closed by advancing the valve stem 74 further in the bushing 56 and toward the housing 12 under forces generated by the actuator 78. This movement of the valve stem 74 toward the housing 12 will transmit forces to the diaphragm actuator button 70. The spherically generated convex surface 72 of the diaphragm actuator button 70 will be urged tightly against the initially convex outer surface 48 of the dished portion 44 of the diaphragm 40. These forces will cause the dished portion 44 of the diaphragm 40 to deflect into the orientation shown in FIG. 3. In this configuration, the spherically generated convex surface 72 of the diaphragm actuator button 70 will contact only the central portion of the initially convex outer surface 48 of the diaphragm 40, and will urge the centermost regions of the diaphragm 40 beyond the plane extending tangentially across the toroidal sealing bead 28. Thus, central portions of the outer surface 48 of the sealed diaphragm 40 will be deflected to have a slightly concave shape. The concave shape assumed by the outer surface 48 of the diaphragm 40 will be substantially symmetrical relative to the toroidal sealing bead 28. Conceivably, the diaphragm actuator button 70 initially may not be perfectly aligned with the axis of the toroidal sealing bead 28. However, as the outer surface 48 of the diaphragm 40 deflects into the concave shape shown in FIG. 3, the diaphragm actuator button 70 will float transversely to be centered relative to the concave shape assumed by the outer surface 48 of the diaphragm 40. The floating will be generated by a slight sliding movement of the spherically generated convex surface 72 of the diaphragm actuator button 70 along the concave outer surface 48 of the diaphragm and in response to forces generated by the valve stem 74. The transverse floating will end when the center of the convex surface 72 of the diaphragm actuator button 70 is coincident with the center of the concave portions assumed by the outer surface 48 of the diaphragm 40. This float will center the diaphragm actuator button along the axis about which the toroidal sealing bead 28 is generated. Coaxial positioning of the diaphragm actuator button 70 and the toroidal sealing bead 28 will result in a substantially uniform application of forces to the diaphragm 40 with a high quality seal uniformly around the toroidal sealing bead. Portions of the diaphragm 40 between the diaphragm seat 26 and the center of the diaphragm actuator 70 will exert significant biasing forces against the toroidal sealing bead 28. These forces will effectively define a circular line of contact at the plane of tangency or slightly inwardly therefrom as shown in somewhat exaggerated form in FIG. 3. These biasing forces will contribute to a high quality seal without the presence of non-metallic materials at the sealing interface.

Subsequent opening and closing of the valve 10 will cause the metal diaphragm 40 to seat at substantially the same position on the toroidal sealing bead 28 with virtually no metal-to-metal sliding movement of the diaphragm 40 against the toroidal sealing bead 28. Additionally, the diaphragm actuator button 70 is unlikely to float out of coaxial alignment with the axis of the toroidal sealing bead during subsequent actuations. Thus, unlike prior art all-metal valves described above, there is no generation of wear debris that could affect the purity of gases being transported. Furthermore, the very hard alloy of the layers 51, 53 and 55 of the diaphragm 40 exhibit good spring characteristic and resiliency, and thus will exert high sealing forces against the toroidal sealing bead 28. The softer layers 52 and 54 undergo micromovement relative to the adjacent hard layers 51, 53 and 55 and enable the adjacent hard layers 51, 53 and 55 to deform slightly into sealing engagement with the toroidal sealing bead 28 despite any microscopic surface irregularities that might exist at the sealing interface. This micromovement between the hard and softer layers is facilitated by the silver plating on the softer layers.

While the invention has been described with respect to a preferred embodiment, it is apparent that various changes can be made without departing from the scope of the invention as defined by the appended claims. For example, the diaphragm may be formed from fewer or more layers of metal. Additionally, the arrangement of layers of material in the diaphragm may be slightly different from that shown herein. However, the layers of the diaphragm should be arranged to ensure a very hard metallic alloy for engagement with the toroidal sealing bead and a relatively soft layer adjacent to the hard layer. Additionally, the valve housing may take other forms, with different relative positions for the inlet and outlet passages and with other actuating means, including a pneumatic valve actuator rather than the manual handle depicted herein. These and other changes will be apparent to a person skilled in the art after having read the subject disclosure.

What is claimed is:

1. A diaphragm valve, comprising:

a metallic valve housing with an open-sided valve chamber, an inlet passage extending through said valve housing to said valve chamber and an outlet passage extending through said valve housing from said valve chamber, said valve housing being formed to include a toroidal sealing bead in said valve chamber and surrounding said inlet passage;

a metallic diaphragm secured to said valve housing to substantially enclose said open-sided valve chamber, said diaphragm including a dished central portion having, in an unbiased condition, an initially concave face in juxtaposed relationship to said toroidal sealing bead and being spaced from said toroidal sealing bead for permitting fluid flow into said inlet passage, through said valve chamber and out of said outlet passage, said diaphragm, in an unbiased condition, further having an initially convex face facing away from said valve chamber;

a valve stem disposed externally of said valve chamber and being selectively movable along an axis toward and away from said diaphragm; and a diaphragm actuator button disposed between said valve stem and said diaphragm, said diaphragm actuator button being movable with said valve stem along said axis and being slidably movable relative to said valve stem in directions transverse to said axis, said diaphragm actuator button having a convex face engaged with the initially convex face of said central portion of said diaphragm for selectively deflecting said metallic diaphragm into tight sealing engagement with said toroidal sealing bead in response to movement of said valve stem toward said valve housing for interrupting fluid flow into and out of said valve chamber, whereby said slidable movement of said diaphragm actuator button transverse to said axis of said valve stem enables the diaphragm actuator button to float into coaxial alignment with the central portion of the diaphragm for achieving substantial uniform application of forces between the diaphragm and the toroidal sealing bead.

2. The diaphragm valve of claim 1, wherein the convex face of the diaphragm actuator button is spherically generated.

3. The diaphragm valve of claim 1, wherein said diaphragm actuator button is formed from stainless steel.

4. The diaphragm valve of claim 1, wherein said initially convex central portion of said diaphragm is disposed relative to said toroidal sealing bead such that said portions of said diaphragm engaging said actuator button assume a concave configuration, when said diaphragm is sealingly engaged with said toroidal sealing bead, the concave configuration assumed by portions of said diaphragm engaging said actuator button enabling the transverse movement of said actuator button relative to said axis and into concentric alignment with said central portion of said diaphragm.

5. The diaphragm valve of claim 1, further comprising actuator means for selectively moving said valve stem toward and away from said valve housing.

6. The diaphragm valve of claim 5, wherein the actuator means non-rotatably moves said valve stem.

7. The diaphragm valve of claim 6, wherein the actuator means is an automatic pneumatic actuator.

8. The diaphragm valve of claim 1, wherein the metallic diaphragm comprises at least three layers of metallic material disposed in adjacent non-bonded relationship to one another, said layers comprising a sealing layer disposed for engagement with the toroidal sealing bead, an actuating layer disposed for engagement with said diaphragm actuator button and at least one inner layer therebetween, said inner layer being formed from a metal material softer than said sealing layer and said actuating layer and permitting micromovement and minor deformations of said layers for sealing surface discontinuities in either one of said diaphragm and said toroidal sealing bead.

9. The diaphragm valve of claim 1, further comprising a bushing having a central aperture therethrough, at least a portion of said valve stem being disposed in said central aperture of said bushing, said valve stem and portions of said central aperture of said bushing adjacent said valve stem being cross-sectionally dimensioned to permit slidable movement of said valve stem along said axis of said valve stem, at least a portion of the diaphragm actuator button being disposed in said central aperture of said bushing, said diaphragm actuator button being cross-sectionally smaller than adjacent portions of the central aperture of the bushing by a sufficient amount to permit movement of the diaphragm actuator button both parallel to the axis of the valve stem and transverse to the axis of the valve stem, thereby permitting the diaphragm actuator button to float transversely into concentric alignment with the toroidal sealing bead of the valve chamber.

10. The diaphragm valve of claim 9, wherein the diaphragm actuator button includes a smoothly finished planar face aligned substantially orthogonal to the axis of the valve stem, and wherein the valve stem includes a smoothly finished planar face aligned orthogonal to the axis of the valve stem and engaged with the smoothly finished planar face of the diaphragm actuator button, the smoothly finished planar faces permitting transverse float of the diaphragm actuator button relative to the valve stem for achieving coaxial alignment of the diaphragm actuator button with the toroidal sealing bead of the valve housing.

11. The diaphragm valve of claim 10, further comprising an automatic pneumatic actuator for generating selective movement of the valve stem toward and away from said diaphragm.

12. The diaphragm valve of claim 11, wherein the metallic diaphragm comprises at least three layers of metallic material disposed in adjacent non-bonded relationship to one another, said layers comprising a sealing layer disposed for engagement with the toroidal sealing bead, an actuating layer disposed for engagement with said diaphragm actuator button and at least one inner layer therebetween, said inner layer being formed from a metal material softer than said sealing layer and said actuating layer and permitting micro-movement and minor deformations of said layers for sealing surface discontinuities in either one of said diaphragm and said toroidal sealing bead.

13. An automatically actuatable diaphragm valve for high pressure gas lines, comprising:

a metallic valve housing with an open-sided valve chamber, an inlet passage extending through said valve housing to said valve chamber and an outlet passage extending through said valve housing from said valve chamber, said valve housing being formed to include a toroidal sealing bead in said valve chamber and concentrically surrounding said inlet passage;

a metallic diaphragm mounted in said valve housing to substantially enclose said open-sided valve chamber, said diaphragm including a central portion in juxtaposed relationship to said toroidal sealing bead, said central portion, in an unbiased condition, being dished with a concave surface facing said valve chamber and a convex surface facing outwardly from said valve chamber, said concave surface being substantially concentric with said toroidal sealing bead and spaced therefrom for permitting gas flow through said inlet passage, into said valve chamber and out of said outlet passage;

a valve stem axially movable relative to said valve housing toward and away from said diaphragm;

a diaphragm actuator button disposed between said valve stem and said diaphragm, said diaphragm actuator button having an outer face floatably engaged with said valve stem for movement transverse to the axial movement of the valve stem, said actuator button further having a convex inner face adjacent said outer surface of said diaphragm; and an actuator for selectively and non-rotatably moving said valve stem toward and away from said diaphragm, whereby movement of said valve stem toward said diaphragm urges said inner surface of said diaphragm into sealing engagement with said toroidal sealing bead and urges said outer surface of said diaphragm into a concave shape concentrically within said toroidal sealing bead, and whereby said diaphragm actuator button floats transversely into substantially concentric alignment with said toroidal sealing bead as said outer surface of said diaphragm deflects into said concave shape.

14. The diaphragm valve of claim 13, further comprising a bushing having a central aperture therethrough, at least a portion of said valve stem being disposed in said central aperture of said bushing, said valve stem and portions of said central aperture of said bushing adjacent said valve stem being cross-sectionally dimensioned to permit slidable movement of said valve stem along said axis of said valve stem, at least a portion of the diaphragm actuator button being disposed in said central aperture of said bushing, said diaphragm actuator button being cross-sectionally smaller than adjacent portions of the central aperture of the bushing by a sufficient amount to permit movement of the diaphragm actuator button both parallel to the axis of the valve stem and transverse to the axis of the valve stem, thereby permitting the diaphragm actuator button to float transversely into concentric alignment with the toroidal sealing bead of the valve chamber.

15. The diaphragm valve of claim 14, wherein the diaphragm actuator button includes a smoothly finished planar face aligned substantially orthogonal to the axis of the valve stem, and wherein the valve stem includes a smoothly finished planar face aligned orthogonal to the axis of the valve stem and engaged with the smoothly finished planar face of the diaphragm actuator button, the smoothly finished planar faces permitting transverse float of the diaphragm actuator button relative to the valve stem for achieving coaxial alignment of the diaphragm actuator button with the toroidal sealing bead of the valve housing.

16. The diaphragm valve of claim 15, wherein the metallic diaphragm comprises at least three layers of metallic material disposed in adjacent non-bonded relationship to one another, said layers comprising a sealing layer disposed for engagement with the toroidal sealing bead, an actuating layer disposed for engagement with said diaphragm actuator button and at least one inner layer therebetween, said inner layer being formed from a metal material softer than said sealing layer and said actuating layer and permitting micro-movement and minor deformations of said layers for sealing surface discontinuities in either one of said diaphragm and said toroidal sealing bead.

\* \* \* \* \*